(12) United States Patent
Nachenberg et al.

(10) Patent No.: US 7,739,740 B1
(45) Date of Patent: Jun. 15, 2010

(54) DETECTING POLYMORPHIC THREATS

(75) Inventors: Carey Nachenberg, Northridge, CA (US); Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1140 days.

(21) Appl. No.: 11/233,195

(22) Filed: Sep. 22, 2005

(51) Int. Cl.
*G06F 11/30* (2006.01)
*G06F 12/14* (2006.01)
*G08B 23/00* (2006.01)

(52) U.S. Cl. ............ 726/25; 726/22; 726/23; 726/24; 709/206; 713/187; 713/188

(58) Field of Classification Search ............ 713/188
See application file for complete search history.

(56) References Cited

U.S. PATENT DOCUMENTS

| | | | | |
|---|---|---|---|---|
| 5,826,013 | A * | 10/1998 | Nachenberg | 726/22 |
| 5,842,002 | A | 11/1998 | Schnurer et al. | |
| 5,854,916 | A * | 12/1998 | Nachenberg | 703/21 |
| 5,944,821 | A * | 8/1999 | Angelo | 726/22 |
| 5,949,973 | A | 9/1999 | Yarom | |
| 6,301,699 | B1 | 10/2001 | Hollander et al. | |
| 6,941,473 | B2 | 9/2005 | Etoh et al. | |
| 7,526,809 | B2 * | 4/2009 | Liang et al. | 726/24 |
| 7,568,233 | B1 * | 7/2009 | Szor et al. | 726/25 |
| 2002/0066024 | A1 * | 5/2002 | Schmall et al. | 713/200 |
| 2002/0073323 | A1 * | 6/2002 | Jordan | 713/188 |
| 2003/0177394 | A1 * | 9/2003 | Dozortsev | 713/201 |
| 2004/0255165 | A1 * | 12/2004 | Szor | 713/201 |
| 2005/0166268 | A1 * | 7/2005 | Szor | 726/24 |
| 2006/0259974 | A1 * | 11/2006 | Marinescu et al. | 726/25 |
| 2007/0055711 | A1 * | 3/2007 | Polyakov et al. | 707/203 |

FOREIGN PATENT DOCUMENTS

WO    WO 01/37095 A1    5/2001

OTHER PUBLICATIONS

Wang, Y.-M.; Beck, D.; Vo, B.; Roussev, R.; Verbowski, C., "Detecting stealth software with Strider GhostBuster," Dependable Systems and Networks, 2005. DSN 2005. Proceedings. International Conference on , vol., No., pp. 368-377, Jun. 28-Jul. 1, 2005.*

(Continued)

*Primary Examiner*—Matthew T Henning
(74) *Attorney, Agent, or Firm*—Fenwick & West LPP

(57) ABSTRACT

A polymorphic threat manager monitors an incoming email stream, and identifies incoming email messages to which executable files are attached. The polymorphic threat manager characterizes incoming executable files according to at least one metric. For example, the polymorphic threat manager can decompose an executable file into fragments, hash some or all of these, and use the hashes as characterization metrics. The polymorphic threat manager subsequently de-obfuscates executable files, and creates corresponding characterization metrics for the de-obfuscated images. The characterizations of executable files before and after de-obfuscation are compared, and if they differ sufficiently, the polymorphic threat manager determines that the file in question is polymorphic. The characterization metrics of such an executable file after de-obfuscation can be used as a signature for that file.

21 Claims, 2 Drawing Sheets

OTHER PUBLICATIONS

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [first retrieved May 1, 2003]. Retrieved from the Internet: <URL: http://pageexec.virualave.net/docs/randustack.txt>, copy retrieved Mar. 21, 2005 from <http://www.pax.grsecurity.net/docs/randustack.txt>.

Randkstack web pages [online]. Virtualave.net [first retrieved May 1, 2003]. Retrieved from the Internet: <URL: http://pageexec.virualave.net/docs/randkstack.txt>, copy retrieved Mar. 21, 2005 from <http://www.pax.grsecurity.net/docs/randkstack.txt>.

Randmap web pages [online]. Virtualave.net [first retrieved May 1, 2003]. Retrieved from the Internet: <URL: http://pageexec.virualave.net/docs/randmmap.txt>, copy retrieved Mar. 21, 2005 from <http://www.pax.grsecurity.net/docs/randmmap.txt>.

Randexec web pages [online]. Virtualave.net [first retrieved May 1, 2003]. Retrieved from the Internet: <URL: http://pageexec.virualave.net/docs/randexec.txt>, copy retrieved Mar. 21, 2005 from <http://www.pax.grsecurity.net/docs/randexec.txt>.

VMA Mirroring web pages [online]. Virtualave.net [retrieved May 1, 2003]. Retrieved from the Internet: <URL: http://pageexec.virualave.net/docs/vmmirror.txt>, copy retrieved Mar. 21, 2005 from <http://www.pax.grsecurity.net/docs/vmmirror.txt>.

Aho, Alfred V., et al. Compilers, Addison-Wesly Publishing Company, USA, revised edition 1988, pp. 585-598, 633-648.

Periot, Frederic, "Defeating Polymorphism Through Code Optimization", Paper given at the Virus Bulletin conference, Sep. 26-27 Oct. 2003 pp. 142-159, Toronto, Canada, published by Virus Bulletin Ltd., The pentagon, Abington, Oxfordshire, England.

* cited by examiner

DETECTING POLYMORPHIC THREATS

TECHNICAL FIELD

This invention pertains generally to computer security, and more specifically to robustly detecting and generating signatures for polymorphic malicious code.

BACKGROUND

Mass-mailing worms are some of the most prevalent and troublesome threats to Internet users today. Worms like Netsky, Beagle, MyDoom, and most recently, Sober, have caused millions of dollars in damage and cleanup costs. To make matters worse, the increasing availability and quality of runtime packers and other obfuscation tools are making it easier for worm writers to automate the creation of new variants of a worm, making analysis more complicated and time consuming.

Generated signatures can be utilized in order to detect and block malicious code. However, existing signature generation methodologies do not account for oligomorphic or polymorphic malicious executable images, which can change their external form each time they replicate. The existing signature generation methods do not detect the fact that these different forms are instantiations of the same worm. Therefore, such methods create a different signature for each new replica of the worm. This can overwhelm any agent (such as a centralized correlation server) processing the detection and management of malicious code.

What is needed are methods, systems and computer readable media for generating robust signatures that can commonly identify a polymorphic worm in its various forms.

DISCLOSURE OF INVENTION

Computer-implemented methods, computer systems and computer-readable media manage polymorphic malicious code. A polymorphic threat manager monitors an incoming email stream, and identifies incoming email messages to which executable files are attached. The polymorphic threat manager characterizes incoming executable files according to at least one metric. For example, the polymorphic threat manager can decompose an executable file into fragments, hash some or all of these, and use the hashes as characterization metrics. The polymorphic threat manager subsequently de-obfuscates executable files, and creates corresponding characterization metrics from the de-obfuscated file images. The characterizations of executable files before and after de-obfuscation are compared, and if they differ sufficiently, the polymorphic threat manager determines that the file in question is polymorphic. The characterization metrics of such an executable file after de-obfuscation can be used as a signature for that file.

These automatically generated characterization metrics can be used as the input to a larger, distributed correlation system. In such scenarios, after identifying a polymorphic executable file, the polymorphic threat manager submits only de-obfuscated characterization metrics to the correlation system. This filtration reduces the load on the correlation system, which could otherwise be overwhelmed by attempts to correlate the huge number of unrelated characterization metrics that would be generated from an obfuscated polymorphic image.

The polymorphic threat manager can also compare characterizations of de-obfuscated executable files to characterizations of the de-obfuscated images of known malicious polymorphic entities, and where they are substantially similar, determine that the executable file comprises that malicious polymorphic entity. More specifically, the polymorphic threat manager can compare characterizations of executable files after de-obfuscation to characterizations of stored de-obfuscated images of executable files received earlier and determined to be polymorphic. Responsive to the characterization of an executable file after de-obfuscation being sufficiently similar to the stored characterization of a de-obfuscated executable file known to be polymorphic, the polymorphic threat manager concludes that the two executable files comprise different forms of a single polymorphic executable file.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
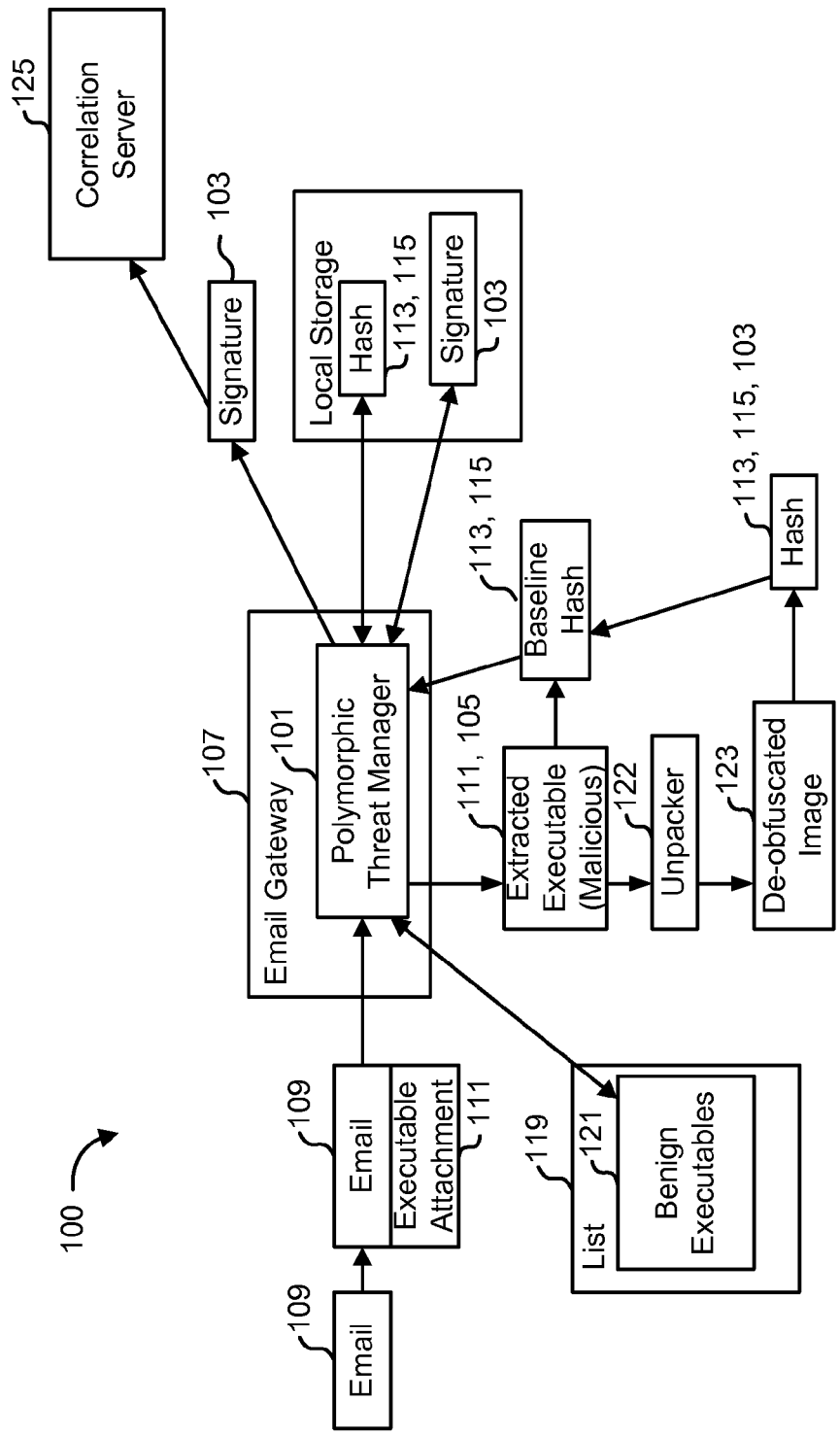
FIG. 1 is a block diagram, illustrating a high level overview of a system for managing polymorphic threats, according to some embodiments of the present invention.

FIG. 1 illustrates a high level overview of a system 100 for practicing some embodiments of the present invention. A polymorphic threat manager 101 detects and generates signatures 103 for polymorphic malicious code 105. It is to be understood that although the polymorphic threat manager 101 is illustrated as a single entity, as the term is used herein a polymorphic threat manager 101 refers to a collection of functionalities which can be implemented as software, hardware, firmware or any combination of these. Where a polymorphic threat manager 101 is implemented as software, it can be implemented as a standalone program, but can also be implemented in other ways, for example as part of a larger program, as a plurality of separate programs, as one or more device drivers or as one or more statically or dynamically linked libraries.

One of the distinguishing characteristics of polymorphic threats 105 is that they typically decrypt themselves in order to execute the actual viral body. Typically, this viral body remains fixed, though the outward appearance of the virus or worm might change from generation to generation due to the re-encryption of the body. The polymorphic threat manager 101 exploits the tell-tale decryption behavior to automate the identification of polymorphic executables 105, and when possible, to extract a signature 103 from the viral bodies.

The polymorphic threat manager 101, which can operate, for example on an email gateway 107 as illustrated, watches all incoming email 109, and extracts all executable attachments 111 for further analysis. The polymorphic threat manager 101 takes one or more baseline metric(s) 113 of each extracted executable file 111. In one embodiment of the present invention, the metric 113 is in the form of one or more baseline hashes 115 of the unprocessed executable attachment 111. In such an embodiment, typically, an executable file 111 is decomposed into various fragments 117, and then a hash 115 of each fragment 117 is computed. The polymorphic threat manager 101 can compute the hash 115 by applying any suitable hashing algorithm, such as CRC, MD5, or SHA-1. The polymorphic threat manager 101 can decompose the file 111 into one or more pieces (not illustrated) based on any consistent criteria, such as identifying sections within the executable format (PE format on Windows, ELF on Linux, etc.).

In some embodiments, the hashes 115 (or other metric 113 type) of the executable file 111 are compared to a pre-computed list 119 of signatures 105 of known benign executables 121. All metrics 113 that match an entry on the list 119 of known benign executables 121 are adjudicated to be themselves associated with legitimate executables 121, and are not further processed.

Figure 2:
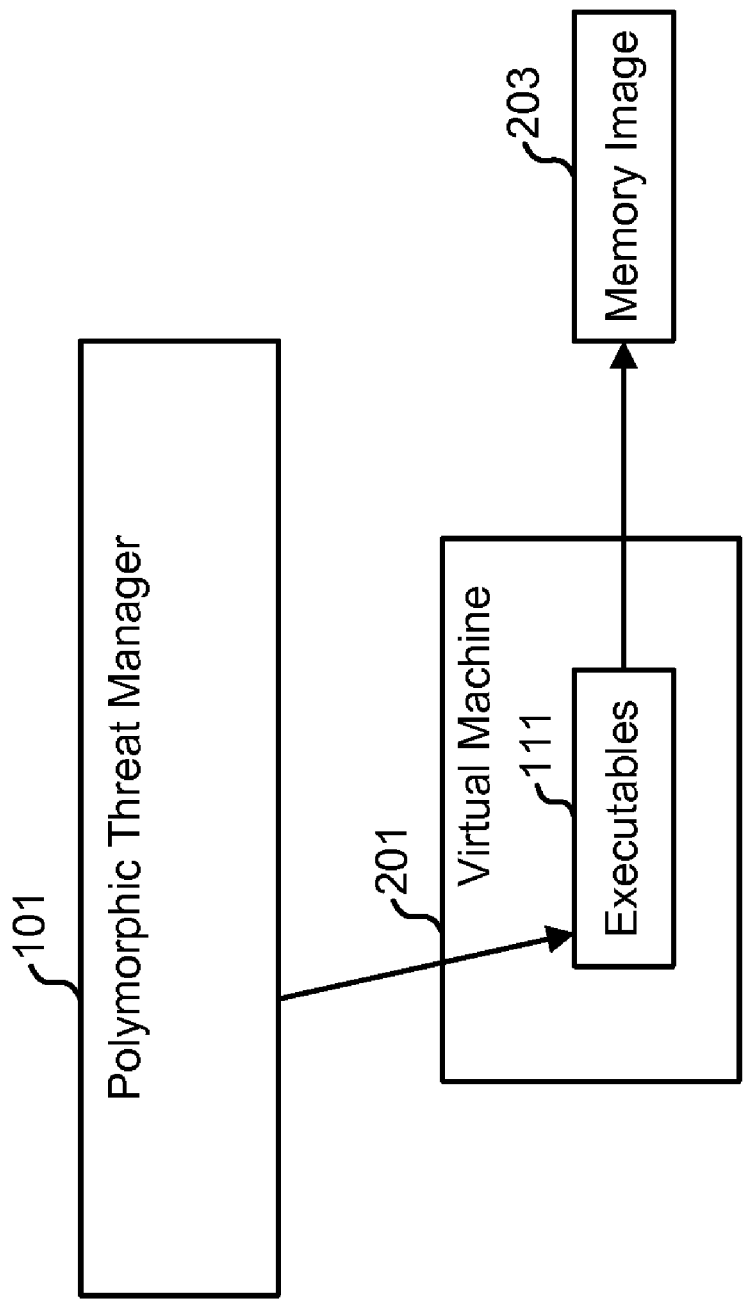
FIG. 2 is a block diagram illustrating a polymorphic threat manager running an executable attachment in a virtual machine and using the memory dump as a characterization metric, according to one embodiment of the present invention.

Turning now to FIG. 2, it is to be understood that in other embodiments an executable file 111 can be characterized according to metrics 113 other than hashes thereof 115. As illustrated in FIG. 2, in some embodiments the polymorphic threat manager 101 characterize the executable file 111 by running it, e.g., in an emulator (not illustrated) or a virtual machine 201, dumping the resulting memory image 203 and using that as a characterization metric 113. The polymorphic threat manager 101 can also characterize the executable file 111 by running it and tracking instruction usage, recording a control flow graph of at least one section thereof, noting a size, range or entropy of at least a part of at least one section, detecting a transformation of code or data, or detecting the execution of one or more instructions, or the absence thereof. Any of these data can be used as characterization metrics 113, and it is to be understood that in various embodiments, the polymorphic threat manager 101 can utilizes any of these or other metrics 113 as well as combinations thereof in order to characterize executable files 111.

Returning now to FIG. 1, the polymorphic threat manager 101 subsequently passes the executable file 111 through one or more de-obfuscation techniques. For example, the polymorphic threat manager 101 can utilize an unpacker 122 to remove any runtime packing and/or compression from the file 111. The polymorphic threat manager 101 can also run the executable 111 in an emulator or virtual machine 201, dump the memory 203 after detecting decryption or after a fixed amount of time (not illustrated in FIG. 1), and use that as an image 123 of the file 111 in its de-obfuscated form. These techniques remove compression and encryption in the executable file 111, which can be indicators of a polymorphic threat 105. By manipulating the executable 111 into its decrypted, decompressed state, the polymorphic threat manager 101 can better analyze the file 111 and generate a signature 103 therefrom.

In some embodiments, the polymorphic threat manager 101 de-obfuscates executable files 111 by canonicalizing the instructions therein. Malicious code 105 can obfuscate its function by using non-standard or superfluous instructions, or by using more, fewer, or unexpected registers or similar techniques. By standardizing code, the polymorphic threat manager 101 can identify the function thereof, and thus unearth, process and create a single signature 103 for different manifestations of a single polymorphic threat 105.

After de-obfuscation, the same characterization process(es) as described above are applied to the de-obfuscated image 123 obtained from the executable file 111. In some embodiments, the metrics 113 of the de-obfuscated executable 123 are compared to a pre-computed list 119 of signatures 103 from known legitimate executables 121 as described above. As described above, metrics 113 that match a list 119 entry are assumed legitimate and not employed in subsequent processing.

The two sets of characterization metrics 113 (pre and post de-obfuscation) are compared, with any differences between the two indicating that the executable file 111 might be obfuscated and thus polymorphic. If the characterization 113 of a de-obfuscated image 123 is sufficiently different from those of the pre de-obfuscation executable file 111, the executable 111 is adjudicated to be polymorphic. The de-obfuscated image 123 can be stored locally for further analysis, and can also be reported to a centralized component such as a remote correlation server 125. A system in which a central correlation server 125 is utilized in the correlation of malicious code across a network is described in co-pending U.S. patent application Ser. No. 11/214,631, titled "Detection of E-mail Threat Acceleration," filed on Aug. 30, 2005, having the same inventors and assignee, the entirety of which is herein incorporated by reference. It is to be understood that in some but not all embodiments of the present invention, a plurality of polymorphic threat managers 101 are deployed at e-mail gateways 107 across a network, each of which supplies signatures 103 and other information concerning detected polymorphic threats 105 to a correlation server 125, as per the Detection of Email Threat Acceleration application.

The characterizations 113 of executable files 111 found to be polymorphic can be compared to characterizations 113 (signatures 103) of known polymorphic threats 105, in order to determine whether the executable file 111 under analysis comprises one of these. The characterizations 113 of de-obfuscated image 123 can also be compared to characterizations 113 of de-obfuscated images 123 of other polymorphic executables 111 detected in the same manner at the e-mail gateway 107 by the polymorphic threat manager 101. If two or more different executable files 111 have the same de-obfuscated characterizations 113 but have different baseline (pre de-obfuscated) characterizations 113, then the attachments are likely different forms of the same polymorphic threat 105, and are so adjudicated to be. In such a case, the polymorphic threat manager 101 stores the common de-obfuscated characterization 113 locally for use as a signature 103 for that polymorphic threat 105.

In embodiments in which the malicious threat manager 101 submits information to a correlation server 125, when the polymorphic threat manager 101 determines that a given incoming executable attachment 111 has one of the locally stored de-obfuscated characterizations 113, then the polymorphic threat manager 101 only sends the common characterizations 113, and not the remaining metrics 113 (e.g., uncommon hashes 115) for the file 111. This is because the remaining metrics 113 are for the de-obfuscated polymorphic body of the threat rather than the viral portion, and are not valuable for correlation)

Rather than overloading the correlation server 125 with a large number of unique and potentially useless metrics 113, in some embodiment the polymorphic threat manager selects only the metrics 113 (e.g., hashes 115) that are most likely to be successfully correlated. Intelligent metric 113 selection at the malicious threat manager 101 can achieve a decrease in bandwidth and processing at the correlation server 125 by an order of magnitude or more. In such embodiments, the malicious threat manager 101 can comprise an integral component in a robust, scalable correlation infrastructure capable of coping with massive outbreaks of polymorphic worms 105. Since each instance of a polymorphic worm 105 may have a different set of metrics 113, simply forwarding all of the metrics 113 for each executable attachment 111 to the correlation server 125 can cause a flood of different metrics 113 to be reported to the system, potentially resulting in a denial of service situation.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for managing polymorphic malicious code, the method comprising the steps of:
    using a computer to perform steps comprising:
        monitoring an incoming email stream;
        identifying an incoming email message to which an executable file is attached;
        characterizing the executable file according to at least one metric to produce a before characterization;
        de-obfuscating the executable file according to at least one technique, the at least one technique comprising running the executable file in an emulator having a memory and dumping an image of the memory to produce the de-obfuscated executable file;
        characterizing the de-obfuscated executable file according to the at least one metric to produce an after characterization;
        comparing the before characterization of the executable file with the after characterization of the de-obfuscated executable file; and
        determining whether the executable file is polymorphic based on the results of the comparing step, wherein the determining comprises concluding that the executable file is polymorphic responsive to the before characterization being different from the after characterization.

2. The method of claim 1 wherein characterizing the executable file further comprises:
    hashing at least a portion of the executable file.

3. The method of claim 2 further comprising:
    decomposing the executable file into fragments; and
    hashing at least some of the fragments of the executable file.

4. The method of claim 1 further comprising:
    comparing the before characterization of the executable file to signatures of known legitimate executable files; and
    responsive to the before characterization matching a signature of a known legitimate executable file, not further processing the executable file.

5. The method of claim 1 wherein characterizing the executable file further comprises running the executable file and further performing at least one action from a group of actions consisting of:
    tracking instruction usage;
    recording a control flow graph of at least one section;
    noting a size of at least a part of at least one section;
    noting a range of at least a part of at least one section;
    noting entropy of at least a part of at least one section;
    detecting a transformation of code;
    detecting a transformation of data; and
    detecting the execution of at least one instruction.

6. The method of claim 1 wherein de-obfuscating the executable file further comprises performing at least one action from a group of actions consisting of:
    unpacking the executable file;
    examining the memory image dump; and
    canonicalizing instructions in the executable file.

7. The method of claim 1 further comprising:
    comparing the after characterization of the de-obfuscated executable file to a characterization of a de-obfuscated state of a known malicious polymorphic entity; and
    responsive to the after characterization being similar to the characterization of the de-obfuscated state of the known malicious polymorphic entity, determining that the executable file comprises that malicious polymorphic entity.

8. The method of claim 1 further comprising:
    storing the after characterization of the de-obfuscated executable file if the file is found to be polymorphic.

9. The method of claim 8 further comprising:
    comparing the after characterization of the de-obfuscated executable file to a stored characterization of a stored de-obfuscated executable file known to be polymorphic; and
    responsive to the after characterization being similar to the stored characterization of the de-obfuscated executable file known to be polymorphic, concluding that the two executable files comprise different forms of a single polymorphic executable file.

10. The method of claim 1 further comprising:
    transmitting to a centralized component a portion of the after characterization of the de-obfuscated executable file if the executable file is found to be polymorphic.

11. The method of claim 1, wherein the at least one technique dumps the image of the memory in response to detecting decryption of the executable file.

12. The method of claim 1, wherein the at least one technique dumps the image of the memory after a fixed amount of time.

13. The method of claim 1, wherein the at least one technique dumps the image of the memory after running the executable file in the emulator removes compression and/or encryption in the executable file.

14. A computer readable storage medium containing an executable computer program product for managing polymorphic malicious code, the computer program product comprising:

program code for monitoring an incoming email stream;
  program code for identifying an incoming email message to which an executable file is attached;
  program code for characterizing the executable file according to at least one metric to produce a before characterization;
  program code for de-obfuscating the executable file according to at least one technique, the at least one technique comprising running the executable file in an emulator having a memory and dumping an image of the memory to produce the de-obfuscated executable file;
  program code for characterizing the de-obfuscated executable file according to the at least one metric to produce an after characterization;
  program code for comparing the before characterization of the executable file with the after characterization of the de-obfuscated executable; and
  program code for determining whether the executable file is polymorphic based on the results of the comparing step, wherein the determining comprises concluding that the file is polymorphic responsive to the before characterization being different from the after characterization.

15. The computer program product of claim 14 wherein the program code for characterizing the executable file further comprises:

program code for hashing at least a portion of the executable file.

16. The computer program product of claim 15 further comprising:

program code for decomposing the executable file into fragments; and
  program code for hashing at least some of the fragments of the executable file.

17. The computer program product of claim 14 wherein the program code for characterizing the executable file further comprises program code for running the executable file and further performing at least one action from a group of actions consisting of:

tracking instruction usage;
  recording a control flow graph of at least one section;
  noting a size of at least a part of at least one section;
  noting a range of at least a part of at least one section;
  noting entropy of at least a part of at least one section;
  detecting a transformation of code;
  detecting a transformation of data; and
  detecting the execution of at least one instruction.

18. The computer program product of claim 14 wherein the program code for de-obfuscating the executable file further comprises program code for performing at least one action from a group of actions consisting of:

unpacking the executable file;
  examining the memory image dump; and
  canonicalizing instructions in the executable file.

19. The computer program product of claim 14 further comprising:

program code for comparing the after characterization of the de-obfuscated executable file to a characterization of a de-obfuscated state of a known malicious polymorphic entity; and
  program code for, responsive to the after characterization being similar to the characterization of the de-obfuscated state of the known malicious polymorphic entity, determining that the executable file comprises that malicious polymorphic entity.

20. The computer program product of claim 14 further comprising:

program code for storing the after characterization of the de-obfuscated executable file if the file is found to be polymorphic.

21. A computer system for managing polymorphic malicious code, the computer system product comprising:

a computer readable storage medium storing executable software portions comprising:
    a software portion configured to monitor an incoming email stream;
    a software portion configured to identify an incoming email message to which an executable file is attached;
    a software portion configured to characterize the executable file according to at least one metric to produce a before characteristic;
    a software portion configured to de-obfuscate the executable file according to at least one technique, the at least one technique comprising running the executable file in an emulator having a memory and dumping an image of the memory to produce the de-obfuscated executable file;
    a software portion configured to characterize the de-obfuscated executable file according to the at least one metric to produce an after characterization;
    a software portion configured to compare the before characterization of the executable file with the after characterization of the de-obfuscated executable file; and
    a software portion configured to determine whether the executable file is polymorphic based on the results of the comparing step, wherein the determining comprises concluding that the executable file is polymorphic responsive to the before characterization being different from the after characterization.

* * * * *